United States Patent [19]
Curtis et al.

[11] Patent Number: 5,963,599
[45] Date of Patent: Oct. 5, 1999

[54] TRUNCATED MAXIMUM LIKELIHOOD SEQUENCE ESTIMATOR

[75] Inventors: Robert G. Curtis, Sudbury; Wesley G. Brodsky, Medford, both of Mass.

[73] Assignee: Raytheon Company, Lexington, Mass.

[21] Appl. No.: 08/905,577

[22] Filed: Aug. 4, 1997

[51] Int. Cl.[6] .............................. H03D 1/00; H04L 27/06; H04L 23/02; H04L 5/12
[52] U.S. Cl. .......................... 375/341; 375/262; 375/231; 375/233; 371/43.6
[58] Field of Search .................................. 375/341, 262, 375/231, 232, 233; 371/43.6

[56] References Cited

U.S. PATENT DOCUMENTS

| | | | |
|---|---|---|---|
| 4,736,387 | 4/1988 | Kou-Hu | 375/26 |
| 5,088,111 | 2/1992 | McNamara et al. | 375/18 |
| 5,285,474 | 2/1994 | Chow et al. | 375/231 |
| 5,353,307 | 10/1994 | Lester et al. | 375/233 |
| 5,432,816 | 7/1995 | Gozzo | 375/232 |
| 5,432,821 | 7/1995 | Polydoros et al. | 375/340 |
| 5,481,565 | 1/1996 | Pal | 375/232 |
| 5,491,457 | 2/1996 | Feher | 332/103 |
| 5,513,214 | 4/1996 | Gozzo | 375/232 |
| 5,546,430 | 8/1996 | Liao et al. | 375/341 |
| 5,577,068 | 11/1996 | Bottomley et al. | 375/232 |
| 5,710,792 | 1/1998 | Fukawa et al. | 375/229 |

FOREIGN PATENT DOCUMENTS

| | | | |
|---|---|---|---|
| 0455910 | 11/1991 | European Pat. Off. | H04L 25/30 |
| 0469647 | 2/1992 | European Pat. Off. | H04L 25/30 |

OTHER PUBLICATIONS

Holte et al, A New Digital Echo Canceler for Two–Wire Subscriber Lines, IEEE Transactions on Communications, vol. Com–29, No. 11, Nov. 1981, pp. 1573–1581.

Widrow et al., Stationary & Nonstationary Learning Characteristics of the LMS Adaptive Filter, IEEE vol. 64, No. 8, pp. 1151–1162, Aug. 1976.

(List continued on next page.)

*Primary Examiner*—Stephen Chin
*Assistant Examiner*—Michael W. Maddox
*Attorney, Agent, or Firm*—Wolf, Greenfield & Sacks, P.C.

[57] ABSTRACT

A truncated maximum likelihood sequence estimator that provides a best estimate of a transmitted symbol sequence includes a lookup table and a comparator. The lookup table may be responsive to at least a next sample of a received RF signal, a first decision made on a first previous sample of the RF received signal and a second decision made on the second previous sample of the RF received signal. The lookup table provides at an output at least one threshold value stored in the lookup table that is addressed by the next sample of the received signal, the first decision made on the first previous sample and the second decision made on the second previous sample. The comparator is coupled to the output of a lookup table and is responsive to the at least one threshold value and a current sample of the received RF signal. The comparator compares the current sample of the received RF signal with at least one threshold value and provides a best estimate of the transmitted symbol sequence. The truncated maximum likelihood sequence estimator can be used for example to determine a best estimate of a transmitted symbol sequence of a current sample of 4-ary frequency shift keyed signal or a 2-ary frequency shift keyed received signal. In addition, the truncated maximum likelihood estimator can be used within a wireless radio that transmits and receives an RF waveform including a modulated symbol stream to provide the best estimate of the received modulated symbol stream. Further, the truncated maximum likelihood estimator can be used within a wireless local area network that includes at least one computer interfaced to a wireless radio containing the truncated maximum likelihood sequence estimator to provide wireless communications between either computers or between a computer and a computer network.

16 Claims, 9 Drawing Sheets

OTHER PUBLICATIONS

Matui, Adaptive Reduced–State Sequence Estimation for Linearly and Nonlinearly Distorted Signals in Magnetic Recording Channels, Transactions on Magnetics, IEEE vol. 29, No. 6, Nov. 1993, pp. 4024–4026.

Peterson, Error–Correcting Codes, Second Edition, The MIT Press, pp. 412–427, 1972.

TRUNCATED MAXIMUM LIKELIHOOD SEQUENCE ESTIMATOR

BACKGROUND OF THE INVENTION

1. Field of the Invention

The present invention relates to a truncated maximum likelihood sequence estimator. In particular, the present invention relates to an apparatus for providing a best estimate of signals transmitted over a Wireless Local Area Network (WLAN).

2. Discussion of the Related Art

Digital wireless communication systems are used to convey a variety of information between multiple locations. With digital communications, information is translated into a digital or binary form, referred to as bits, for communication purposes. A transmitter maps this bit stream into a modulated symbol stream, converts the modulated symbol stream to a high frequency radio signal and transmits the high frequency radio signal. A digital receiver receives the high frequency radio signal, down converts the radio signal to a low frequency signal, samples the low frequency signal and maps the sampled signal back into an estimate of the information. In digital wireless communications, the wireless radio environment presents many difficulties that impede successful communications. For example, one difficulty is that the signal level can fade; one of the reasons for fading is that the signal may travel multiple paths due to reflections, causing multiple signal images to arrive at the receiver antenna out of phase and in time-varying relationships. This type of fading is commonly referred to as Rayleigh fading. When the signal fades, a signal-to-noise ratio of the signal becomes lower, causing degradation in the quality of the communication link.

A second problem occurs when the multiple signal paths are much different in length. In this case, time dispersion occurs, wherein multiple fading (i.e. of time-varying magnitude) signal images arrive at the receive antenna at different times, thus giving rise to signal echoes. This causes intersymbol interferences (ISI), where the echoes of one symbol interfere with reception of subsequent symbols transmitted.

A third problem occurs when the signal is passed through a narrow band-pass filter at the transmitter, at the receiver, or at both the transmitter and receiver. The narrow band-pass filter is typically used at the transmitter to reduce signal emissions outside of the frequency band allocated to the signal. A narrow band-pass filter is also typically used at the receiver to mitigate the effect of other signals and noise occupying adjacent frequency channels. However, the long response time of typical narrow band-pass filters also introduces ISI into the signal. In addition, finite bandwidth devices such as, for example, a frequency discriminator commonly used in the digital receiver to demodulate Frequency Shift Keyed (FSK) signals, also introduce ISI.

At the receiver, coherent demodulation is desirable because it provides the best performance. However, this requires knowledge of the multi-path channel. In addition, in many wireless applications, this channel may be time varying due to, for example, transmitter motion, receiver motion, and/or atmosphere effects such as scatterer motion. Thus, there may be a need to track properties of a time varying multi-path channel.

To reduce the ISI resulting from any of the above-described mechanisms, it is known that a Maximum-Likelihood-Sequence-Estimation (MLSE) equalizer may be employed. Such an equalizer considers various hypotheses for the transmitted symbol sequence, and, with a model of the dispersive channel, determines which hypothesis best fits the received data. This can be efficiently realized using the Viterbi Algorithm. This equalization technique is well-known to those skilled in the art, and can be found in standard text books such as J. G. Proakis, *Digital Communications*, 2d ed., NY: McGraw-Hill, chapter 6, 1989.

However, a problem with the MLSE equalizer is that it is highly complex because, for example, the MLSE equalizer is based upon the assumption that ISI extends over the entire transmitted message and that the communication channel varies with time. Thus, implementation of the MLSE is expensive, requires a lot of hardware and/or software resources, and is power-consuming. Accordingly, a decision feedback equalizer (DFE) has been suggested as an alternative to the MLSE.

Referring to FIG. 1, there is illustrated a linear DFE as known to those of skill in the art and as described, for example, in an article titled "An Adaptive RAM-DFE for Storage Channels", *IEEE Transactions on Communications*, Vol. 39, No. 11, November 1991. At the receiver, a received signal is typically filtered, amplified, mixed down to a baseband signal and sampled at least once every symbol period of the transmitted signal to yield a stream of samples $y_k$. The samples $y_k$ on line 140 are provided to a feed forward filter 142 having L corresponding feed forward coefficients or weights represented by vector $w=[w_0 \ldots w_{L-1}]'$. An output of the feed forward filter on line 144 is a product of the feed forward coefficients and the sampled output $w'y_k$ where $y_k$ is a vector of sampled outputs. A sequence of past decisions $\hat{a}_k$ output by a decision block 146 is also provided on line 148 to a Finite Impulse Response (FIR) filter 150 in a decision feedback section of the DFE. The FIR filter has M corresponding coefficients represented by vector $b=[b_1 \ldots b_M]'$ and an output of the FIR filter is $b'\hat{a}_k$ which is provided on line 152 to a summing block 154. In an optimal case, the FIR filter is a model of the ISI of the channel or a causal spectral factor of the channel autocorrelation. The output from the FIR filter $b'\hat{a}_k$ is subtracted from the feed forward filter output $w'y_k$ to cancel the ISI in a least-square manner. The output $z_k$ of the summing block on line 155 is:

$$z_k = w'y_k + b'\hat{a}_k \quad (1)$$

Accordingly, an appropriate setting for the coefficient vectors in the DFE minimizes the mean-square error $E[e_k^2]$, where:

$$e_k = \hat{a}_k - z_k \quad (2)$$

However, one problem with the DFE of FIG. 1 as known to those of skill in the art is that it is only capable of eliminating linear ISI. Accordingly, there is a need for a DFE that is capable of canceling non-linear ISI.

FIG. 2 illustrates a RAM-DFE that has been proposed as a solution to this problem. FIG. 2 illustrates the DFE of FIG. 1, wherein the FIR filter 150 has been replaced by a lookup table 102 to comprise the RAM-DFE as illustrated in FIG. 2. The RAM-DFE is described, for example, in the previously cited article entitled "An Adaptive RAM-DFE for Storage Channels", *IEEE Transactions on Communications* Vol. 39, No. 11, November 1991; as well as an article entitled "A Comparison of Maximum Likelihood Sequence Detection and Non-linear Decision Feedback Equalization on the Digital Magnetic Recording Channel", published in the record of the conference GLOBECOM '91 in 1991. For the RAM DFE of FIG. 2, M past decisions of $\hat{a}_k$ are arranged in a vector and used as a lookup table address, and the contents of the address location are interpreted as the corresponding lookup table output. An analysis of the RAM-DFE of FIG. 2 is then the same as that of the DFE of FIG. 1.

The effects of time varying channels can be accounted for in the DFE of FIG. 1 by updating the coefficients or "weights" on the taps of the FIR filter 150. This is done by well known techniques such as Least Means Square (LMS) filtering, described in an article entitled "Stationary and Non-Stationary Learning Characteristics of the LMS Adaptive Filter", *Proceedings of the IEEE*, Vol. 64, No. 8, August 1976. Similarly, the effects of time varying channels can be accounted for in the RAM-DFE of FIG. 2 by updating the contents of the look-up table 102 by, for example, methods described in the previously cited article titled "An Adaptive RAM-DFE for Storage Channels", *IEEE Transactions of Communications*, Vol. 39, No. 11, November 1991. However, updating the coefficients for either of the DFE of FIG. 1 or the RAM-DFE of FIG. 2 adds further complexity to the equalizer, thus requiring further hardware or software resources, power and expense.

In FIGS. 1 and 2, it can be seen that a decision $\hat{a}_k$ on a current sample, on line 149, is a function of several future samples to be processed on line 140 and several decisions already made on past samples on line 148.

In addition, the DFE of FIG. 1 requires several coefficients in both filter 142 and filter 150 and the RAM-DFE of FIG. 2 also requires several coefficients in filter 142. Further, decision thresholds which are used by the DFE to make a best estimate of the sequence of the transmitted signal, are fixed for both the DFE of FIG. 1 and the RAM-DFE of FIG. 2. Thus, where there is a need for several decision thresholds such as, for example, where the DFE is to make a best estimate of a received symbol of a 4-ary FSK signal, the difference between the thresholds is fixed and cannot be varied as a function of the received sequence of data samples. Accordingly, there is a need for a DFE that allows for variation of the decision thresholds.

Another alternative that has been used by those of skill in the art to reduce the ISI is a conventional lookup table processor such as is illustrated in FIGS. 3–4. FIG. 3 illustrates a functional block diagram of a DFE for a 4-ary Frequency Shift Keyed (FSK) transmitted signal. A 4-ary FSK transmitted signal is modulated with any of four different frequencies to encode the symbol information transmitted as the FSK signal. In particular, for a 4-ary FSK transmitted signal, the transmitted signal can take on any one of four states: a first state corresponding to a digital sequence "00"; a second state corresponding to a digital sequence "01"; a third state corresponding to a digital sequence "11"; and a fourth state corresponding to a digital sequence "10". The DFE of FIG. 3 determines a most likely sequence of transmitted bits, one bit of the sequence at a time, using a current sample $a_0$ of the 4-ary received FSK signal, a next sample $a_1$ of the received signal, a decision $d_{-1}$ made on a previous sample of the received signal, and a decision $d_{-2}$ made on a previous to the previous sample of the received signal.

For example, an 8-bit next sample $a_1$ of the received signal may be provided on line 100 to the lookup table 102. In addition, the next sample is delayed by one clock cycle with delay element 104 to provide to the lookup table on line 106 a current 8-bit sample $a_0$ of the received signal. The lookup table contains a plurality of weights $w_i$ used to compute a value of the input signal $y_0$ with reduced ISI according to equation (3):

$$y_0 = a_1 w_1 + a_0 w_0 + d_{-1} w_{-1} + d_{-2} w_{-2} \tag{3}$$

A reduced ISI input signal $y_0$ is then compared with three fixed threshold values $tf_i$, where i=1,2,3, to provide at an output on line 108 a 2-bit decision $d_0$. In particular, the reduced ISI signal $y_0$ is compared against the three fixed threshold values $tf_1$, $tf_2$ and $tf_3$ to make the 2-bit decision $d_0$ on the current sample. Thus, the conventional lookup table processor provides at the output on line 108 the 2-bit decision $d_0$ on the current sample. In addition, the decision on the current sample is delayed by delay element 110 to provide on line 112 to the lookup table the 2-bit decision $d_{-1}$ on the previous sample. Further the decision $d_{-1}$ is delayed by delay element 114 to provide on line 116 to the lookup table, the 2-bit decision $d_{-2}$ on the previous to the previous sample.

However, the lookup table 102A of the conventional lookup table processor of FIG. 3 requires a minimum of twenty bits of input capacity: eight bits for the next sample $a_{-1}$, eight bits for the current sample $a_0$, two bits for the decision $d_{-1}$ made on the previous sample and two bits for the decision $d_{-2}$ made on the previous to the previous sample. In particular, the lookup table requires a minimum of $2^{20}$ or 1,048,576 memory locations wherein each memory location has at least two bits of capacity to store the decision $d_0$ from the current sample. Thus, the lookup table requires a minimum of 2,097,152 bits of total capacity.

FIG. 4 illustrates a functional block diagram implementing a conventional lookup table processor for a 2-ary FSK transmitted signal. A 2-ary FSK transmitting signal can be modulated with one of two frequencies to encode digital information which can take on one of two states; a digital "0" or a digital "1". The DFE of FIG. 4 determines a most likely sequence of transmitted bits, one bit of the sequence at a time, using a current sample $a_0$ of the received 2-ary FSK transmitted signal, a next sample $a_1$ of the received signal, a sample after the next sample $a_2$ of the received signal, a decision $d_{-1}$ made on a previous sample of the received signal, and a decision made on a previous to the previous sample of the received signal.

For example, a 6-bit sample after the next sample $a_2$ of the received signal is provided to a lookup table 102B on line 118. In addition, the 6-bit sample is delayed by one clock cycle with delay element 120 to provide a 6-bit next sample $a_1$ on line 122 to the lookup table. The 6-bit next sample is also delayed by one clock cycle with delay element 124 to provide on line 126 a current 6-bit sample $a_0$ to the lookup table. The lookup table operates in a manner as similar to that described above with respect to FIG. 2. In particular, the lookup table determine a value of the input signal with reduced ISI $y_0$ according to Equation (4):

$$y_0 = a_2 w_2 + a_1 w_1 + a_0 w_0 + d_{-1} w_{-1} + d_{-2} w_{-2} \tag{4}$$

A reduced ISI signal $y_0$ is compared to a fixed threshold value $t_y$ and a 1-bit decision $d_0$ is output on line 128. Thus, the lookup table 102B provides at the output on line 128 a 1-bit decision $d_0$ on the current sample. In addition, the decision on the current sample is delayed by delay element 130 to provide on line 132 to the lookup table a 1-bit decision $d_{-1}$ on the previous sample. Further, the decision $d_{-1}$ is delayed by delay element 134 to provide on line 136 to the lookup table a 1-bit decision $d_{-2}$ on the previous to the previous sample.

However, the lookup table of the DFE of FIG. 4 requires at a minimum twenty bits of address for an input: six bits for a sample after the next sample $a_2$; six bits for the next sample $a_1$; six bits for the current sample $a_0$; one bit for the decision made on the previous sample $d_{-1}$; and one bit for the decision made on the previous to the previous sample $d_{-2}$. In other words, the lookup table requires $2^{20}$ or 1,048,576 memory locations each having at least one bit of capacity to store the decision $d_0$ on the current sample or in other words 1,048,576 bits of total capacity.

It is accordingly an object of the present invention to improve upon the conventional lookup table processor, the DFE and the MLSE of the related art.

SUMMARY OF THE INVENTION

According to one embodiment of the present invention, a truncated maximum likelihood sequence estimator provides a best estimate of a transmitted symbol and includes a memory containing a lookup table and a comparator. Each threshold value within the lookup table is a function of a next sample of a received signal, a first decision made on a first previous sample of the received signal and a second decision made on a second previous sample of the received signal. The lookup table provides at an output at least one threshold value from an addressed location within the lookup table identified by the next sample of the received signal, the first decision made on the first previous sample and the second decision made on the second previous sample. The comparator is coupled to the output of the lookup table and is responsive to the at least one threshold value output by the lookup table and a current sample of the received signal. The comparator compares the current sample of the received signal with the at least one threshold value and provides the best estimate of the transmitted symbol.

This embodiment of the truncated maximum likelihood sequence estimator may be used to provide a best estimate of the transmitted symbol of the current sample of a 4-ary frequency shift keyed received signal. For this embodiment the at least one threshold value will include three threshold values. In addition, for this embodiment the current sample of the 4-ary frequency shift keyed received signal and the next sample of the 4-ary frequency shift keyed received signal may be eight bits in length, and each of the first decision and the second decision may be two bits in length. The lookup table address is also responsive to a 2-bit control signal that selects one of the three threshold values to be output by the lookup table. Thus the lookup table may contain a minimum of $2^{14}$ addressable locations each having an 8-bit capacity.

This embodiment of the truncated maximum likelihood sequence estimator may also be used to provide a best estimate of the transmitted symbol of the current sample of a 2-ary frequency shift keyed signal. For this embodiment the at least one threshold value is a single threshold value, the lookup table is responsive to a first sample of the 2-ary FSK received signal, a second sample of the 2-ary FSK received signal, the first decision and the second decision made by the truncated maximum likelihood estimator. In addition, for this embodiment the first sample and the second sample may be six bits in length and the first decision and the second decision may be one bit in length. Thus, for this embodiment, the lookup table may contain a minimum of $2^{14}$ addressable memory locations, each memory location having a 6-bit capacity.

According to another embodiment of the present invention, a wireless digital unit for communicating over a wireless medium includes an antenna that transmits and receives an RF waveform including a modulated symbol stream, a transmitter coupled to the antenna, a receiver coupled to the antenna and a modem coupled to each of the transmitter and the receiver. The transmitter receives a mapped data stream from the modem, modulates the mapped data stream to provide the modulated symbol stream and converts the modulated symbol stream to the RF waveform. The receiver converts the received RF waveform to a demodulated symbol stream and samples the demodulated symbol stream to provide samples of the demodulated symbol stream. The modem maps digital information into the mapped data stream that is sent to the transmitter and also unmaps samples of the demodulated symbol stream to provide a best estimate of the demodulated symbol stream. The modem includes a truncated maximum likelihood sequence estimator that includes a memory containing a lookup table and a comparator. The lookup table includes a plurality of threshold values wherein each threshold value is a function of at least a next sample of a received signal, a first decision made on a first previous sample of the received signal and a second decision made on a second previous sample of the received signal. The lookup table provides at an output at least one threshold value from an addressed location within the lookup table identified by the next sample of the received signal, the first decision made on the first previous sample and the second decision made on the second previous sample. The comparator is coupled to the output of the lookup table and is responsive to the at least one threshold value provided by the lookup table and a current sample of the received signal. The comparator compares the current sample of the received signal with the at least one threshold value and provides the best estimate of the transmitted symbol.

According to yet another embodiment of the present invention a wireless local area network includes a computer interfaced to a first wireless digital unit. The wireless local area network also includes a processor that is interfaced to a second wireless digital unit so that the computer may communicate wirelessly with the processor to provide ad-hoc wireless connectivity between a first computer and a second computer or to provide wireless connectivity between the first computer and a computer network. The first and second wireless digital units each include a memory containing a lookup table and a comparator. The lookup table includes a plurality of threshold values wherein each threshold value is a function of at least a next sample of a received signal, a first decision made on a first previous sample of the received signal and a second decision made on a second previous sample of the received signal. The lookup table provides at an output at least one threshold value from an addressed location within the lookup table identified by the next sample of the received signal, the first decision made on the first previous sample and the second decision made on the second previous sample. The comparator is coupled to the output of the lookup table and is responsive to the at least one threshold value provided by the lookup table and a current sample of the received signal. The comparator compares the current sample of the received signal with the at least one threshold value and provides the best estimate of the current sample of the received signal.

According to a method of the present invention, a TMLSE of the present invention including a memory containing a lookup table can be calibrated by generating a known data sequence, providing the known data sequence to a WLAN card including the TMLSE, as a modulated RF waveform; sampling the modulated RF waveform, outputting samples of the RF waveform; and calculating the variable threshold values from the known data and the sample values. In particular, the step of calculating the variable threshold values includes determining fixed threshold values that are a part of the variable threshold values from the sampled values; determining intermediate weight values that are part of the variable threshold values from the sampled values and prior decisions made on the sampled values; and calculating the variable threshold values from the fixed threshold values and the intermediate weight values.

Other objects and features of the present invention will become apparent from the following detailed description when taken in connection with the following drawings. It is to be understood that the drawings are for the purpose of illustration only and are not intended as a definition of the limits of the invention.

BRIEF DESCRIPTION OF THE DRAWINGS

The foregoing and other objects and advantages will be more fully appreciated from the following drawing in which.

DETAILED DESCRIPTION OF THE INVENTION

Figure 5A:
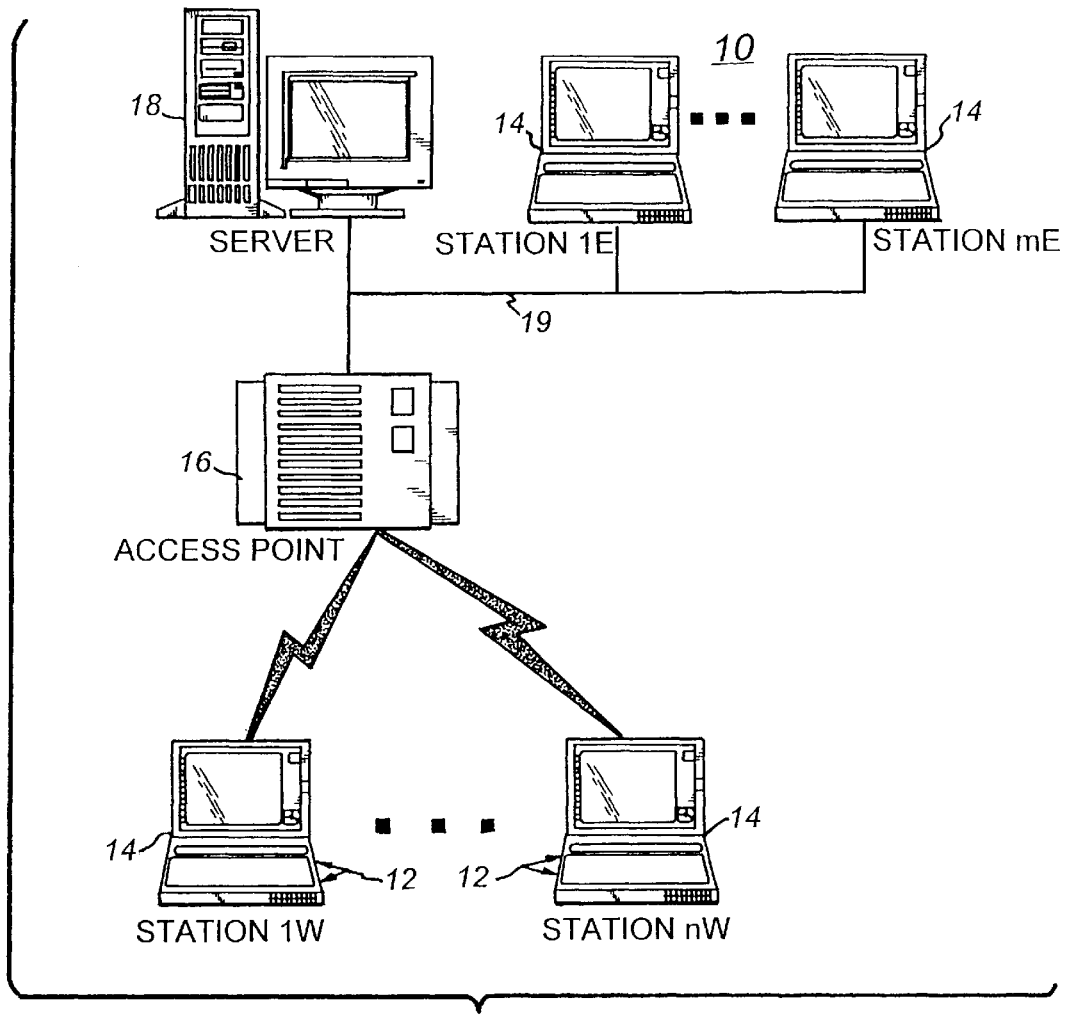
FIGS. 5a, 5b illustrate a block diagram of a wireless local area network that may use a truncated maximum likelihood sequence estimator of the present invention.
Figure 5B:
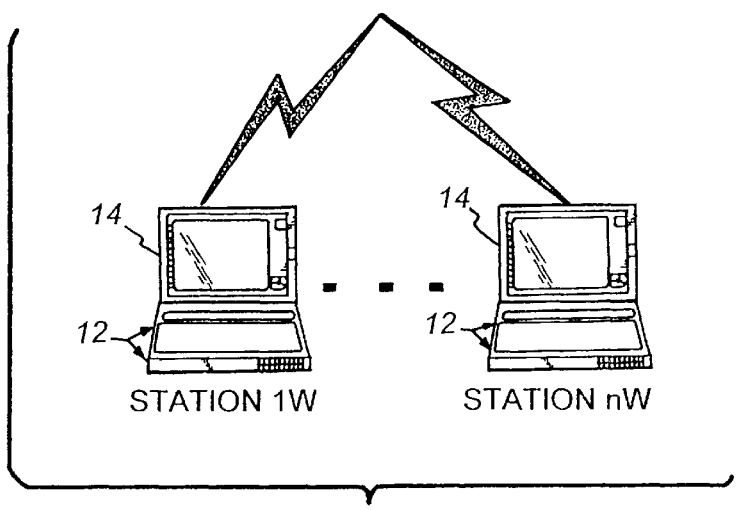

FIGS. 5a and 5b illustrates a block diagram of a simplified wireless local area network (WLAN) 10 such as may use a Truncated Maximum Likelihood Sequence Estimator (TMLSE) of the present invention. Wireless local area networks enable users of personal computers 14, which may include lap top computers, desk top computers and the like, to connect wirelessly to computer networks 18, 19. For example, a wireless radio 12 (not illustrated) may be embodied as a Personal Computer (PC) card and interfaced to the computer within a PC card slot of the computer (e.g. in conformity with the PCMCIA standard) to provide wireless connectivity to any other computer also equipped with the wireless radio. With the wireless radios making up the WLAN, communications can be ad-hoc between lap top and/or personal computers, as illustrated in FIG. 5b or communications may be between a computer and a computer or Ethernet network 19 through an access point 16 for wireless extensions.

Figure 6:
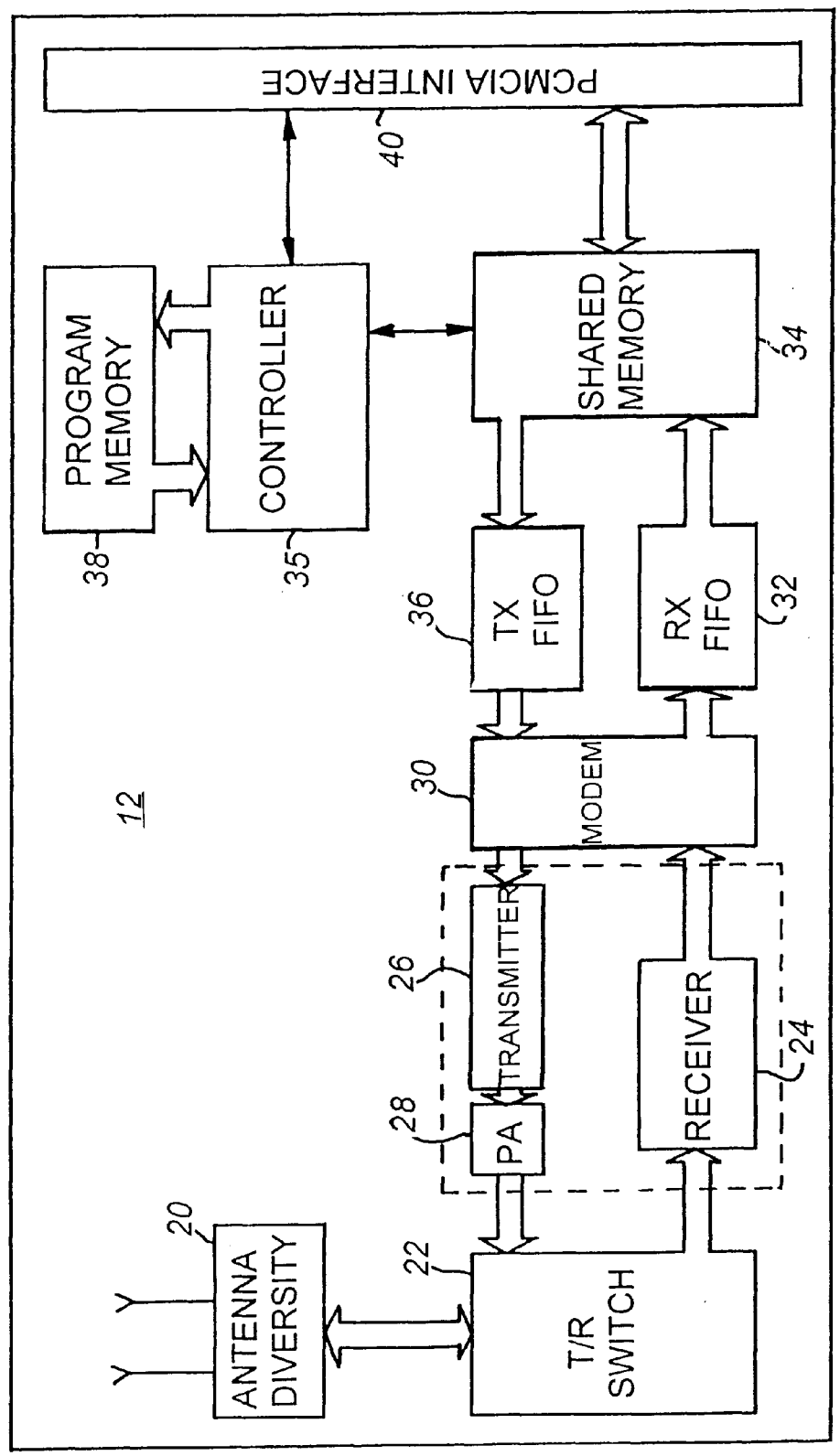
FIG. 6 illustrates a block diagram of a wireless radio of the present invention that may be interfaced with a computer.

FIG. 6 illustrates a block diagram of an embodiment of the wireless radio 12. The wireless radio, typically may be disposed on a PC Card having an interface with a PC Type II (PCMCIA) slot. In particular, one embodiment of the PC Card is 2.2"×5.7"×0.8" and features a flip-up, dual-diversity antenna 20 that transmits and receives Frequency-Shift Keyed (FSK) RF signals over the WLAN 10. The dual diversity antenna is coupled to a T/R switch 22 which may be, for example, a single-pole, double-throw switch that interfaces the dual diversity antenna 20 to one of a receiver 24 and a transmitter 26. The transmitter 26 may include, for example, a digital-to-analog converter (not illustrated) that converts a digital signal received from a odulator/demodulator 30 (Modem) to an analog signal, a low pass filter (not illustrated) that filters the analog signal, at least one mixer (not illustrated) that up-converts the analog signal to the FSK RF signal and a power amplifier 28 that amplifies the FSK RF signal to be transmitted. The receiver may include, for example, a low-noise amplifier (not illustrated) that receives and amplifies with very low added noise a received RF signal, at least one mixer that down-converts an amplified received signal to an Intermediate Frequency (IF), a Band-Pass Filter (not illustrated) that filters out adjacent channel interference, an FM discriminator (not illustrated) which converts frequency variations of the FSK signal to voltage variations, and an analog-to-digital converter (not illustrated) that converts a filtered sinal to a digital signal. In one embodiment of the wireless radio of the present invention, the T/R switch, at least a portion of the receiver and at least a portion of the transmitter may be embodied as a pair of Gallium Arsenide (GaAs) monolithic microwave integrated circuit (MMIC) chips.

In addition, the wireless radio 12 includes the Modem 30 that maps a bit stream received from a transmit First-In, First-Out (FIFO) buffer 36 into a modulated symbol stream and that also unmaps the received digital signal into a best estimate of the transmitted digital bit stream and that outputs the best estimate of the transmitted bit stream to a receive FIFO buffer 32. The receive FIFO buffer temporarily stores the best estimate of the transmitted bit-stream prior to being provided to a shared memory 34. The wireless radio also includes a controller 35 that controls all functions of the radio, a program memory 38 that stores information needed by the radio such as, for example, several software drivers for various operating systems, and the like; as well as a PCMCIA interface 40 that interfaces the radio 12 to the computer through the PCMCIA (PC Card) slot of the computer. In one embodiment of the wireless radio of the present invention, the software drivers stored in the program memory may include, for example, drivers for one or more of DOS, Windows for Workgroups, Windows NT, Windows 95 and Novell NetWare Operating Systems. In addition, in one embodiment of the wireless radio of the present invention, the firmware and drivers stored in the program memory 38 are compliant with IEEE specification 802.11 for WLANs.

The WLAN radio 12 of the present invention may use, for example, Gaussian-Filtered, Frequency-Shift-Keying (GFSK) to filter the received signal and to demodulate the received signal in order to meet spectral confinement requirements of the signal such as, for example, a desired bandwidth. However, such filtering creates Inter-Symbol Interference (ISI) in the demodulated signal output from the receiver 24. In particular, the GFSK filter and the FM discriminator disposed within the receiver 24 create the ISI between received symbols of the received signal. The TMLSE of the present invention takes advantage of two properties of the ISI between the received symbols of the received signal. In particular, the TMLSE takes advantage of the property that the ISI extends only over a few symbols of the received signal, but not the entire received signal as for example is the case with the related art MLSE discussed above. Accordingly, for the TMLSE of the present invention, it is not necessary to use all of the symbols of the received signal such as is required with the MLSE of the related art. In addition, a second property of the ISI that the TMLSE takes advantage of is that the ISI is due only to the transmitter and receiver hardware, but not to time variations in the wireless communication channel between the transmitter and receiver of the wireless radios 12. Accordingly, an adaptive equalizer such as, for example, a Decision Feedback Equalizer (DFE) which is high in complexity and requires a lot of hardware such as discussed above with respect to FIGS. 1–2 is not needed.

Figure 7:
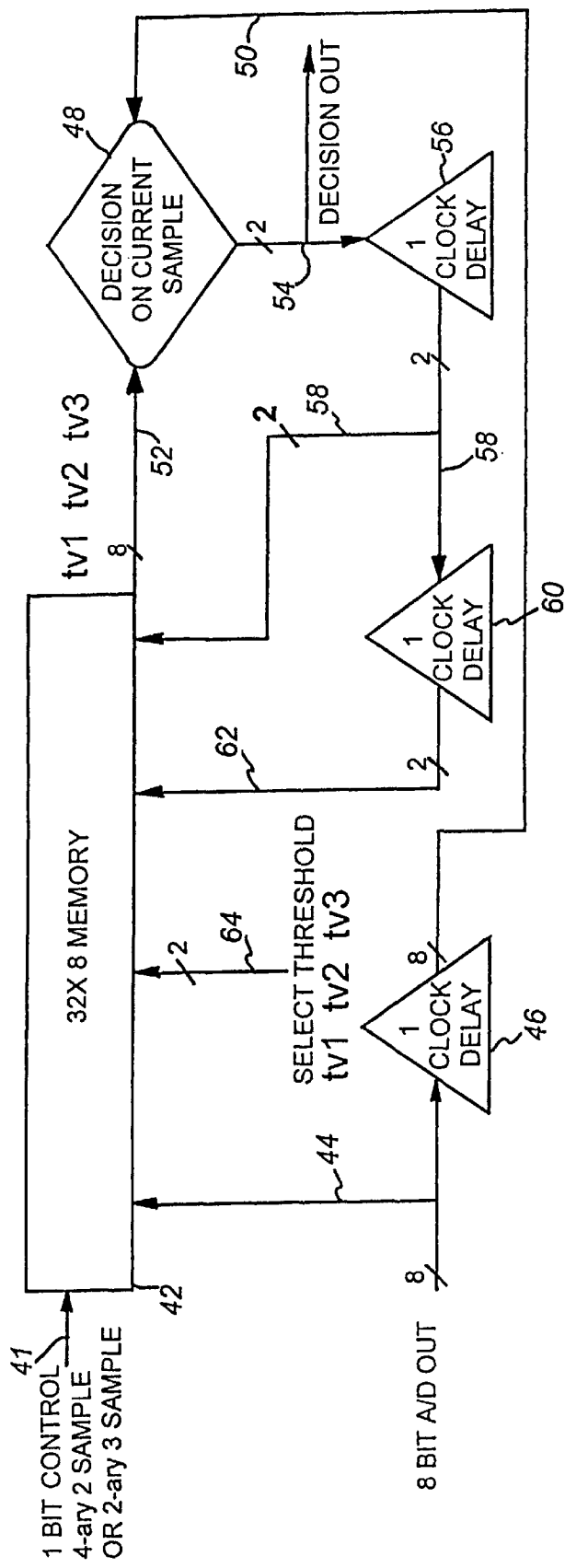
FIG. 7 is a block diagram of a 2-sample plus last-2 decision truncated maximum likelihood estimator of the present invention.

FIG. 7 is a block diagram of a 2-sample plus last-2 decision TMLSE according to one embodiment of the present invention. The TMLSE of FIG. 7, for a sequence of received signal samples of the received signal on line 44, determines a most likely sequence of transmitted bits of the received signal. For the 2-sample plus last-2 decision TMLSE of FIG. 7, a decision may be made, for example, on a 4-ary frequency shift keyed (FSK) transmitted signal, wherein the transmitted signal is modulated with any of four different frequencies to encode the digital sequence of information transmitted over the WLAN. The decision may be made one bit at a time on a current sample of the received signal using a next sample of the received signal, the current sample of the received signal, a result of a previous decision made by the TMLSE on the previous sample of the received signal, and a result of a decision made on a sample of the received signal prior to the previous sample of the received signal. In particular, the next sample of the received signal may be eight bits output from the analog-to-digital (A/D) converter contained within the receiver, and may be provided to a lookup table 42 on line 44. The lookup table may be pre-programmed as will be discussed in further detail below to contain a set of three 8-bit decision thresholds for all possible inputs to the lookup table. In one embodiment of the present invention, the lookup table may be stored in a programmable read only memory (PROM) that makes up a portion of the modem 30 illustrated in FIG. 6.

The TMLSE includes a delay element 46 that delays the 8-bit next sample output from the AID converter by one clock cycle and that provides the current 8-bit sample to a comparator 48 on line 50. The comparator receives the current 8-bit sample and the set of three 8-bit decision thresholds (tv1, tv2 and tv3) sequentially output by the lookup table on line 52 and provides at an output, on line 54, a 2-bit decision of the most likely sequence corresponding to the transmitted signal. In particular, for a 4-ary FSK transmitted signal, the transmitted signal can have any one of four states: a first state corresponding to a digital "00"; a second state corresponding to a digital "01"; a third state corresponding to a digital "11"; and a fourth state corresponding to a digital "10". The three threshold values output by the lookup table are used by the comparator 48 as illustrated in Table 1 to make a decision on the current sample.

TABLE 1

| Decision | Criteria |
| --- | --- |
| State 4 (10) | IF Sample>$tv_3$ |
| State 3 (11) | IF $tv_2$<Sample$\leq tv_3$ |
| State 2 (01) | IF $tv_1$<Sample$\leq tv_2$ |
| State 1 (00) | IF Sample$\leq tv_1$ |

The 2-bit decision on the current sample is then provided on line 54 to a delay element 56 that delays the decision by one clock cycle to provide on line 58 to the lookup table 42, the 2-bit decision made on the previous sample. In addition, the decision made on the previous sample is provided on line 58 to a delay element 60 that delays the decision made on the previous sample by one clock cycle to provide on line 62 to the lookup table, the 2-bit decision made on the previous sample to the previous sample of the received signal. The lookup table also receives on line 64 a 2-bit word that is used to select sequentially one of the three threshold values. This 2-bit word is part of the address used to provide the thresholds for the comparator 48, via line 52. Accordingly, the lookup table has fourteen bits for an input address: eight bits of the next sample on line 44, two bits of the decision made on the previous sample on line 58, two bits of the decision made on the previous sample to the previous sample on line 62 and two bits of the threshold select word on line 64. The lookup table thus has a capacity of $2^{14}$ or 16,384 possible memory locations wherein each memory location is eight bits, or in other words 131,072 bits of total capacity.

Figure 3:
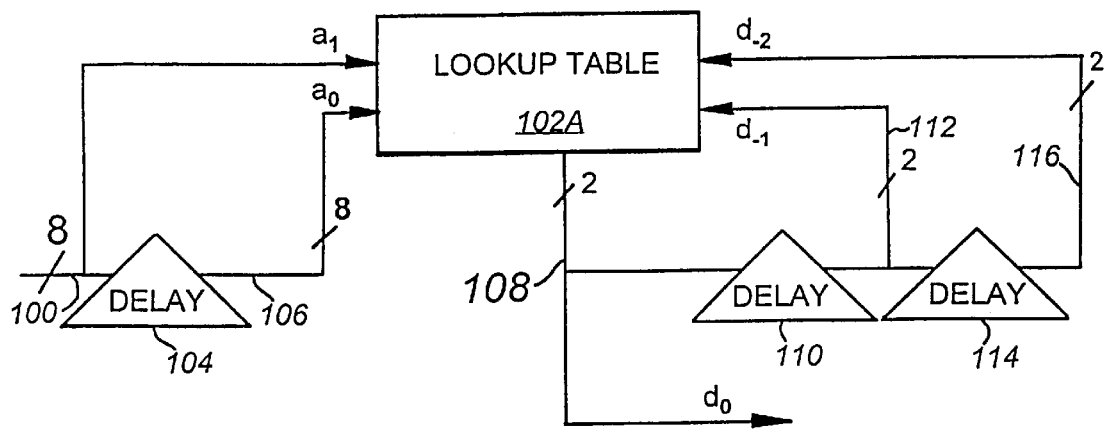
FIG. 3 illustrates a functional block diagram implementing a conventional lookup table processor for a 4-ary FSK transmitted signal.

Accordingly, the TMLSE of the present invention sequentially provides at its output threshold values which are used by the comparator 48 with a current data sample to make a decision on the current data sample. In contrast, the conventional lookup table processor of the related art outputs the decision on the current data sample as a function of previous decisions and next data samples. The lookup table processor of the related art as illustrated in FIG. 3 and as discussed above, requires a minimum of twenty bits for an input address: eight bits for the next sample $a_1$ on line 100; eight bits for the current sample $a_0$ on line 106; two bits for the decision made on the previous sample $d_{-1}$ on line 112; and two bits for the decision made on the previous to the previous sample $d_{-2}$ on line 116. In other words, the lookup table of such related art required $2^{20}$ or 1,048,576 memory locations wherein each memory location has at least two bits of capacity to store the decision $d_0$ on the current sample output on line 108, or requires a minimum of 2,097,152 bits of total capacity. Accordingly, an advantage of the TMLSE of the present invention is that there is a 16 to 1 reduction in the number of bits required for the lookup table 42. Thus, an advantage of the TMLSE of the present invention is that there is a reduction in the hardware or software capacity required by the TMLSE.

Figure 8:
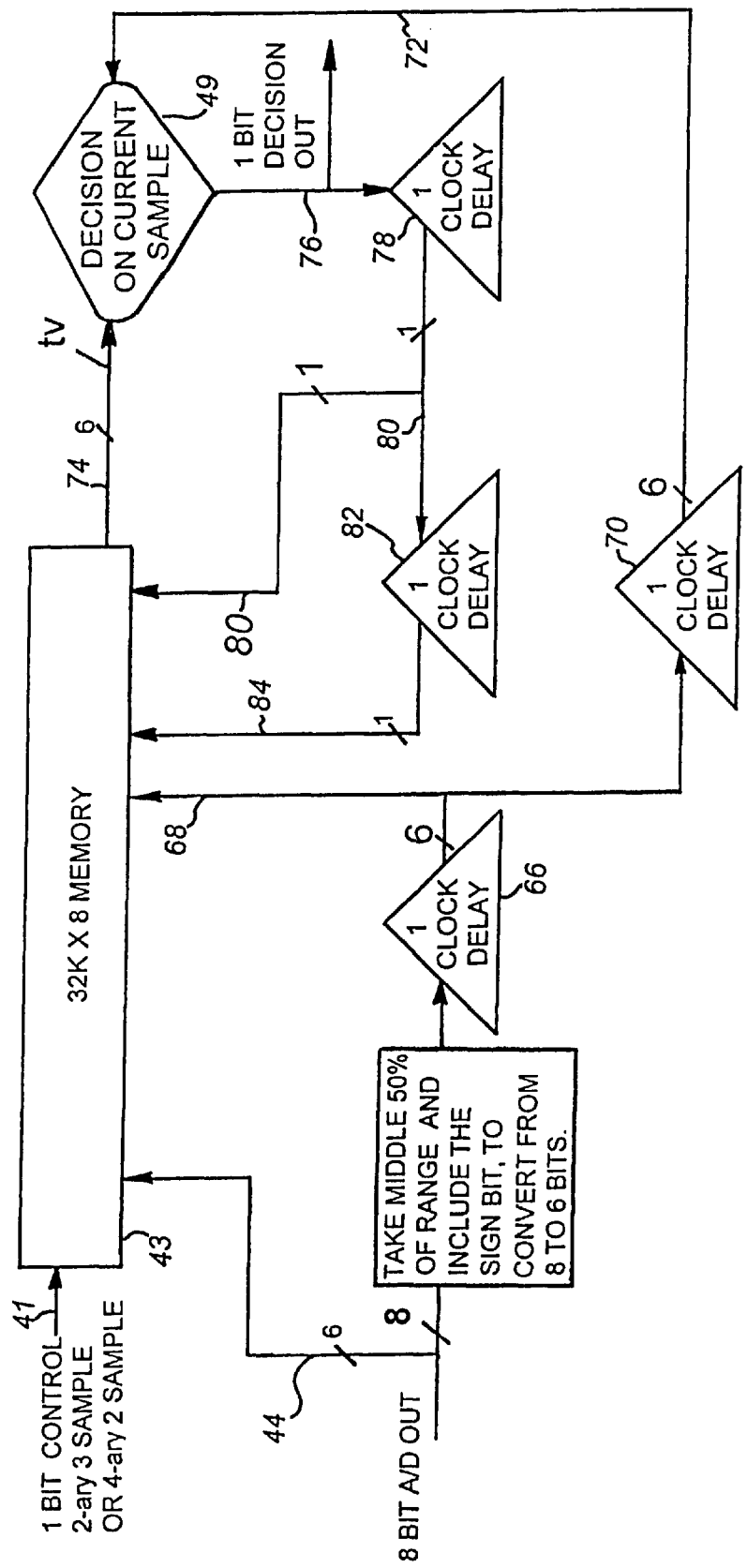
FIG. 8 is a block diagram of a 3-sample plus last 2-decision truncated maximum likelihood sequence estimator of the present invention.

FIG. 8 is a block diagram of a 3-sample plus last-2 decision truncated maximum likelihood sequence estimator according to another embodiment of the present invention. The TMLSE of FIG. 8 may determine a most likely sequence of transmitted bits for a 2-ary FSK transmitted signal, which is modulated with one of two frequencies to encode digital information which can take on one of two states; a digital "0" or a digital "1". In particular, the TMLSE may make a decision on the received sequence of samples one bit at a time using the current received sample of the received signal, the next sample of the received signal, a sample after the next sample of the received signal, the decision made on the previous sample of the received signal and the decision made on the previous sample to the previous sample of the received signal. In one embodiment of the present invention, an 8-bit sample output from the A/D converter within the receiver is reduced to a 6-bit sample which covers a central 50% of the A/D converter range by multiplying the 8-bit sample by 2, maintaining the sign of the product, and taking the most significant six bits of the product. The six bits are chosen as a minimum number of bits needed to yield a bit error rate and a signal-to-signal noise ratio desired for the received signal. However, it is be appreciated that various alterations known to one of skill in the art, such as using the eight bits output from the analog-to-digital converter, are within the scope of the present invention.

The 6-bit sample after the next sample is provided to the lookup table 43 on line 44. In addition, the 6-bit sample is delayed by one clock cycle with delay element 66 to provide the next 6-bit sample on line 68 to the lookup table. The 6-bit next sample is also delayed for one clock cycle by a delay element 70 to provide on line 72 the current 6-bit sample to a comparator 49, which operates in a manner similar to that described above with respect to FIG. 7, except that the decision on the current sample may take on one of two values for the 2-ary FSK transmitted signal. Thus, the comparator receives the current sample on line 72 and a 6-bit threshold value (tv) output by the lookup table 43 on line 74. The comparator uses this information to make the decision on the current sample according to the criteria set out in Table 2, and provides the 1-bit decision on line 76.

TABLE 2

| Decision | Criteria |
| --- | --- |
| State 1 "0" | IF Sample≦tv |
| State 2 "1" | IF Sample>tv |

The 1-bit decision on the current sample is delayed by a delay element 78 for one clock cycle to yield the 1-bit decision made on the previous sample of the received signal which is provided on line 80 to the lookup table 43. The 1-bit decision made on the previous sample is further delayed by one clock cycle with delay element 82 to yield the 1-bit decision made on the previous sample to the previous sample of the received signal and is provided on line 84 to the lookup table.

Accordingly, the lookup table 43 is responsive to fourteen bits for an input address: the six bits of the sample after the next sample on line 44; the six bits of the next sample on line 68; one bit of the decision made on the previous sample of the received signal on line 80 and one bit of the decision made on the previous sample to the previous sample of the received signal on line 84. The lookup table therefore has $2^{14}$ or 16,384 possible memory locations, wherein each memory location contains six bits of capacity to store the threshold value tv. In other words, the lookup table has a capacity of 98,304 bits. The lookup table thus provides at its output a threshold value which is used by the comparator 49 with a current data sample to make a decision on the current data sample.

Figure 4:
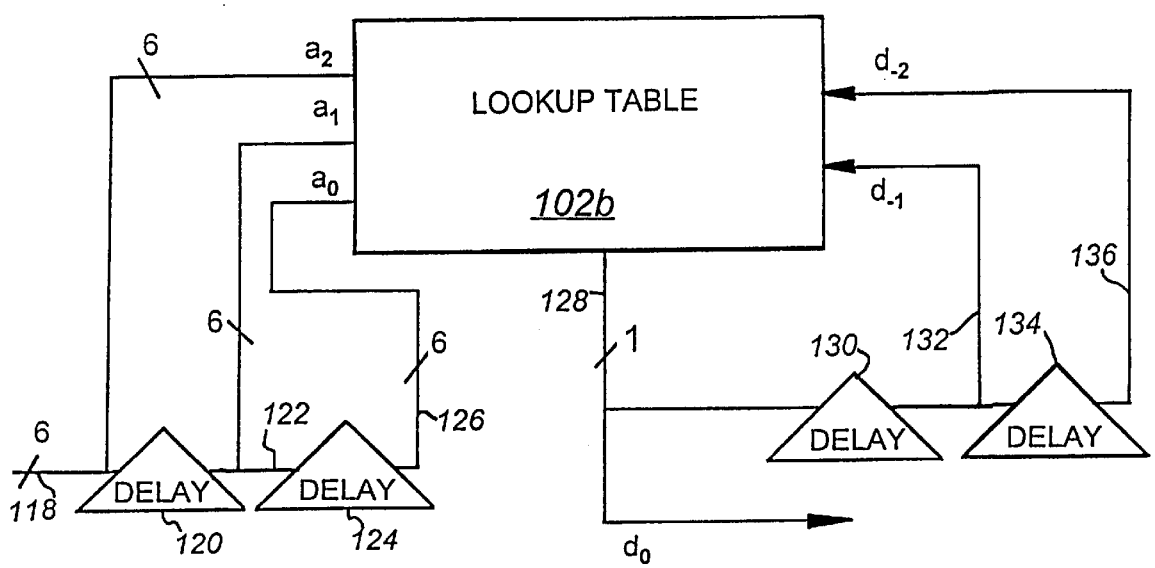
FIG. 4 illustrates a functional block diagram implementing a conventional DFE for a 2-ary FSK transmitted signal.

In contrast, as discussed above with respect to FIG. 4, the related art memory lookup table processor outputs the decision on the current data sample as a function of the current data sample, the previous decision and the next data samples. The related are lookup table processor requires a minimum of $2^{20}$ or 1,048,576 memory locations of 1-bit capacity or in other words 1,048,576 bits of capacity. There is accordingly at least an 11 to 1 reduction in the number of bits of memory capacity used by the TMLSE of FIG. 8 as compared to that of the related art lookup table processor discussed above with respect to FIG. 4.

It is to be appreciated that for each of the TMLSEs of FIGS. 7–8, a dynamic decision of a best estimate of what symbol was transmitted is being made one bit at a time based upon a limited number of samples of the received signal and a limited number of previous decisions made on samples of the received signal. In other words, a dynamic decision is being made on the current sample using a window of information that slides along the received signal with time. It is also to be appreciated that for each of the embodiments of the TMLSE of FIGS. 7–8, the size of the lookup table and thus of the memory limits the number of samples and the number of previous decisions that are used by the TMLSE to make a decision on the current sample of the received signal. However, various alterations and modifications such as using more samples of the received signal, using more decisions made on previous samples of the received signal, or both are intended to be within the scope of the present invention.

An application may require that the receiver hardware be capable of receiving and estimating the transmitted bit stream for either a 2-ary FSK transmittal signal or a 4-ary FSK transmitted signal, with the selection between either of the two being determined, for example, by an external controller. In this case, 16,384 address locations for the 2-ary FSK threshold values and the 16,384 address locations for the 4-ary FSK threshold values can be stored in a single lookup table having 32,768 addressable locations. A single bit line 41 (illustrated in both FIG. 7 and FIG. 8) may be used to select between the 2-ary and 4-ary addressable locations.

Figure 9:
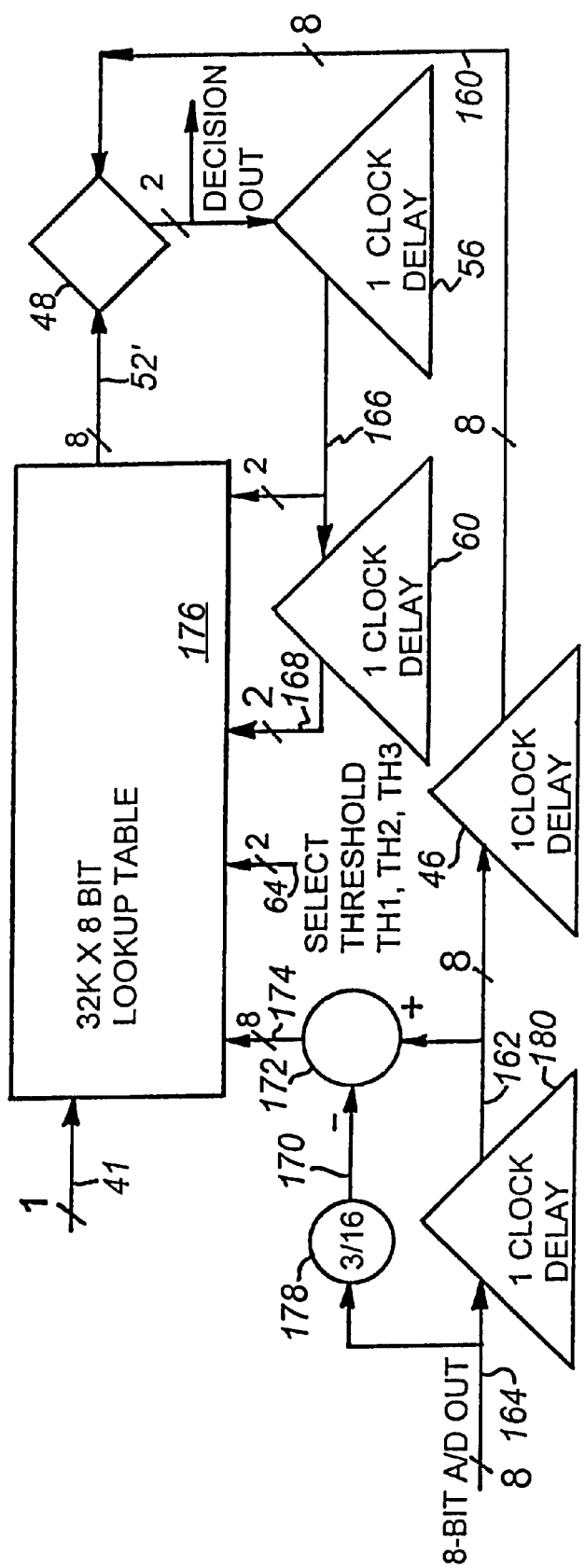
FIG. 9 illustrates a block diagram of a partial 3-sample plus last-2 decision truncated maximum likelihood sequence estimator according to the present invention.

FIG. 9 illustrates a block diagram of a partial 3-sample plus last-2 decision TMLSE according to an embodiment of the present invention that may be used to provide a best estimate of a 4-ary FSK signal. The embodiment of FIG. 9 combines the functions of the lookup table 42 (See FIG. 7) and the lookup table 43 (See FIG. 8) and may be used as an alternative to the 2-sample plus last-2 decision TMLSE shown in FIG. 7. For this embodiment, the delay elements and the comparator are switched between the respective components 46, 48, 56 and 58 for the 4-ary FSK signal (See FIG. 7) and the respective components 49, 66, 70, 78 and 82 (See FIG. 8) for the 2-ary FSK signal. This embodiment may provide better performance than the 2-sample plus last-2 decision TMLSE of FIG. 7 with only a moderate increase in complexity. The decision on the current sample of the received signal on line 160 may be made, one bit at a time, on the current sample of the received signal using a next sample of the received signal on line 162, a sample after the next sample of the received signal on line 164, a result of a first previous decision made by the TMLSE on a previous sample of the received signal on line 166, and a result of a second previous decision made on a sample of the received signal prior to the previous sample of the received signal on line 168. In particular, a fraction such as, for example, ³⁄₁₆ of the sample after the next sample of the received signal is determined by multiplying the sample after the next sample on line 164 with the fraction in multiplier 178 to provide the partial sample on line 170. The sample is delayed one cycle by delay element 180 to provide the next sample of the received signal on line 162. The partial sample on line 176 may be subtracted via adder 172 from the next sample of the received signal on line 162, and an 8-bit result on line 174 is provided to the lookup table 176. The first previous decision made by the TMLSE on a previous sample of the received signal on line 166 and the second previous decision made on the sample of the received signal prior to the previous sample of the received signal on line 168 are provided to the lookup table in the same manner as the 2-sample plus last-2 decision TMLSE described above with respect to FIG. 7. The lookup table may be pre-programmed, as will be discussed in further detail below, to contain the set of three 8-bit variable threshold values for all possible inputs to the lookup table as discussed above with respect to FIG. 7. Another bit provided to the lookup table 176 on line 41 is used to select between the 16,384 memory locations used for decisions on 4-ary FSK data or the 16,384 memory locations used for decisions on 2-ary FSK data, both of which are contained in the 32k×8 bit lookup table 176.

In contrast to the TMLSE of the present invention, the prior art methods discussed above such as the Viterbi Trellis Demodulation MLSE assume that the ISI extends over the entire received signal and thus require a much higher complexity demodulator and therefore require more hardware and/or software resources and/or a larger memory capacity. In addition, the TMLSE of the present invention does not need to compensate for time varying changes in the communication channel, and therefore the TMLSE need not use decision feedback equalization to adapt for changes in the communication channel. Further, the TMLSE uses less memory resources than the lookup table processor of the related art. Therefore, the TMLSE of the present invention is simpler, and requires less hardware, software and/or memory resources than that of the related art methods.

Figure 10:
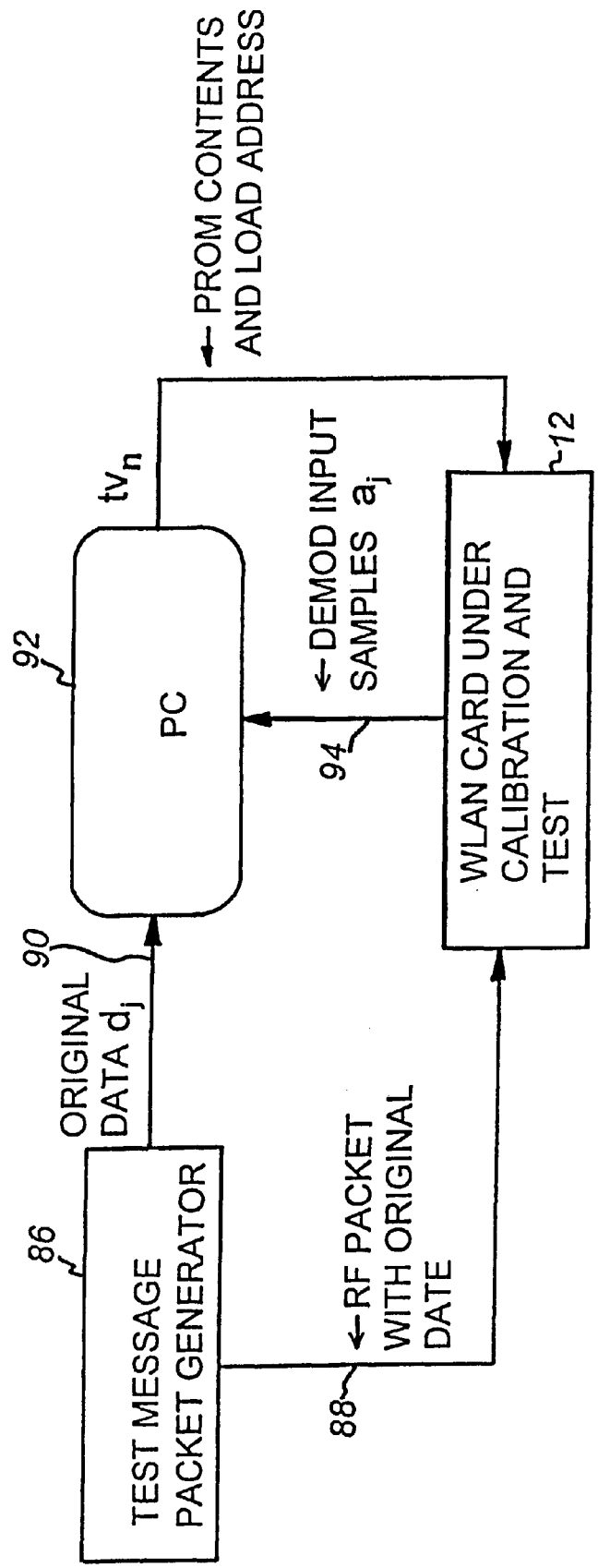
FIG. 10 is a block diagram of a system for calibrating and programming a lookup table of the truncated maximum likelihood sequence estimator of the present invention.

FIG. 10 is a block diagram of a setup for calibrating and programming the lookup table of any of the embodiments of the truncated maximum likelihood sequence estimator of the present invention. The setup includes a test message packet generator 86 that generates an RF waveform including a packet of known data $d_j$. In particular, in one embodiment of the invention, test packet generator generates a random data sequence that is known. This known data is used to modulate a carrier signal such as, for example, to provide a 4-ary GFSK RF waveform that is configured to contain the known data $d_j$. The RF waveform containing the known data $d_j$ is output on line 88 to the wireless radio card 12 that is under calibration and the known data $d_j$ is also output on line 90 to personal computer 92. Assuming that a current data sample is a $j^{th}$ sample of the RF waveform, the WLAN under calibration provides to the PC 92 at line 94 samples $a_j$ of the RF waveform. The known data $d_j$ and the sampled data $a_j$ are used to calculate variable threshold values $tv_n$ that are stored in the lookup table and that are addressed by the sampled values $a_j$ and the prior decisions $d_j$ as discussed above.

For the purposes of illustration, three methods for determining the contents of the lookup table according to the invention will now be described for the 4-ary, 2-sample plus last 2-decision TMLSE illustrated in FIG. 7. It is to be appreciated that the method can also be used for the 2-ary, 3-sample plus last-2 decision TMLSE embodiment illustrated in FIG. 8, with the exception that two 6-bit samples will be used instead of one 8-bit sample as is described below. It is also to be appreciated that this method can be used to calibrate any embodiment of the TMLSE of the present invention.

Figure 1:
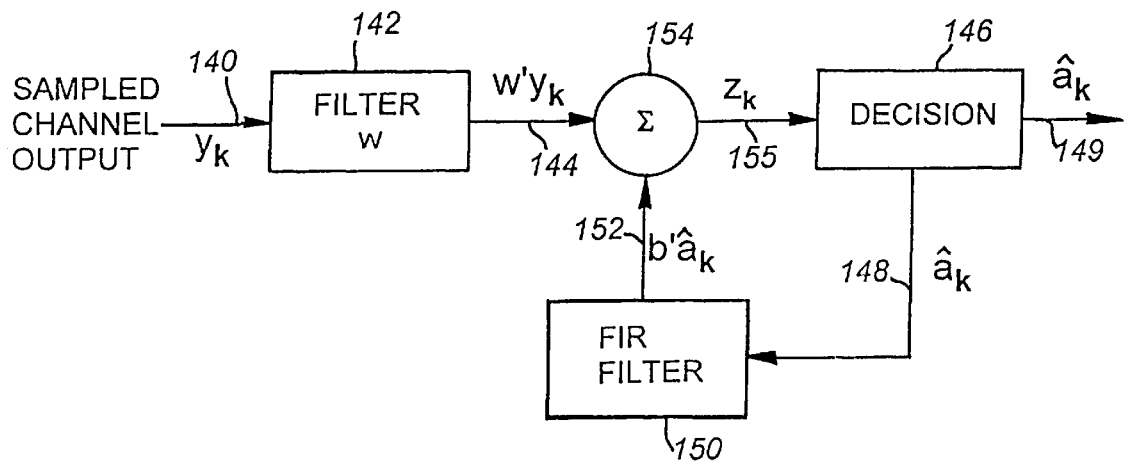
FIG. 1 illustrates a functional block diagram implementing a conventional Decision Feedback Equalizer.
Figure 2:
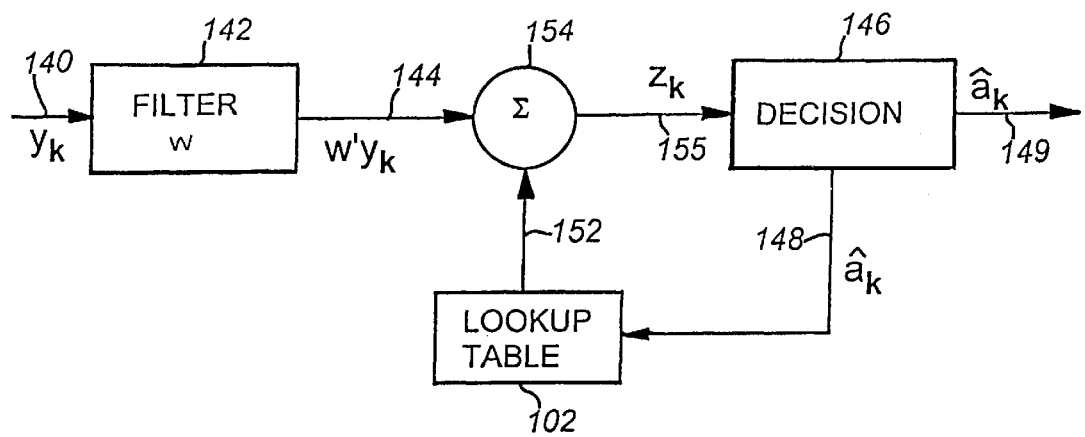
FIG. 2 illustrates a functional block diagram implementing a conventional DFE using a lookup table in a feedback loop of the DFE.
Figure 11A:
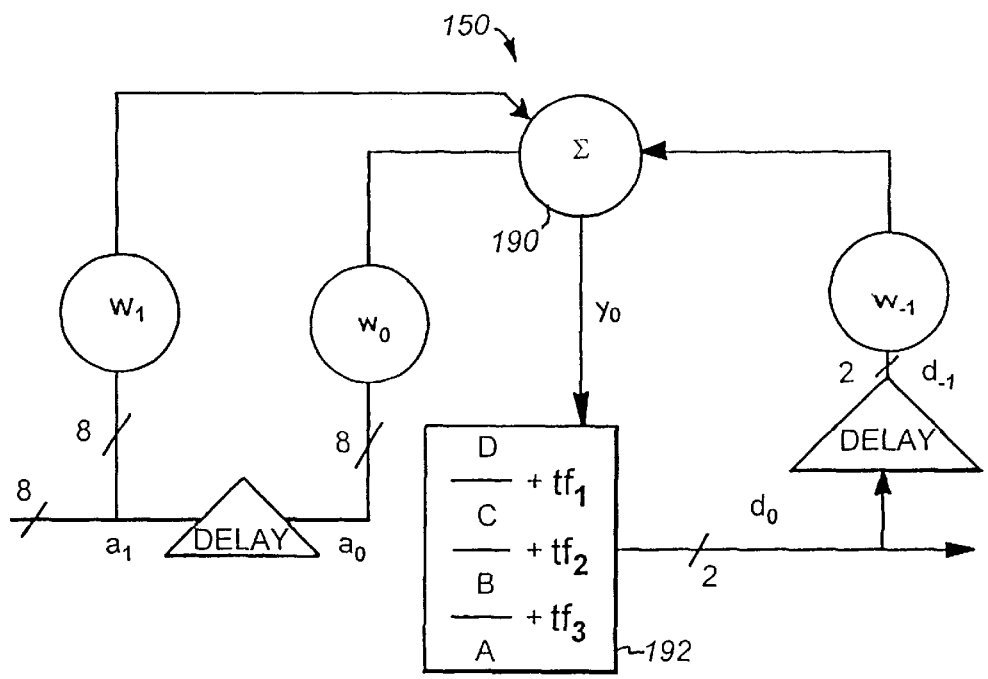
FIG. 11a illustrates a functional block diagram of a FIR filter of a conventional Decision Feedback Equalizer (DFE) of FIG. 1.

According to a first method, the lookup table contents can be derived from the DFE structure shown in FIG. 1. Referring to FIG. 11a, the FIR filter 150 of FIG. 1 has three weights $w_1$, $w_0$, $w_{-1}$. Fixed threshold values $tf_1$, $tf_2$, and $tf_3$ are calculated from equations (8)–(10) as will be discussed below. From FIG. 11a, it can be seen that the output $y_0$ from the summing block of the FIR filter is as defined by equation (5):

$$y_0 = a_1 w_1 + a_0 w_0 + d_{-1} w_{-1} \quad (5)$$

Figure 11B:
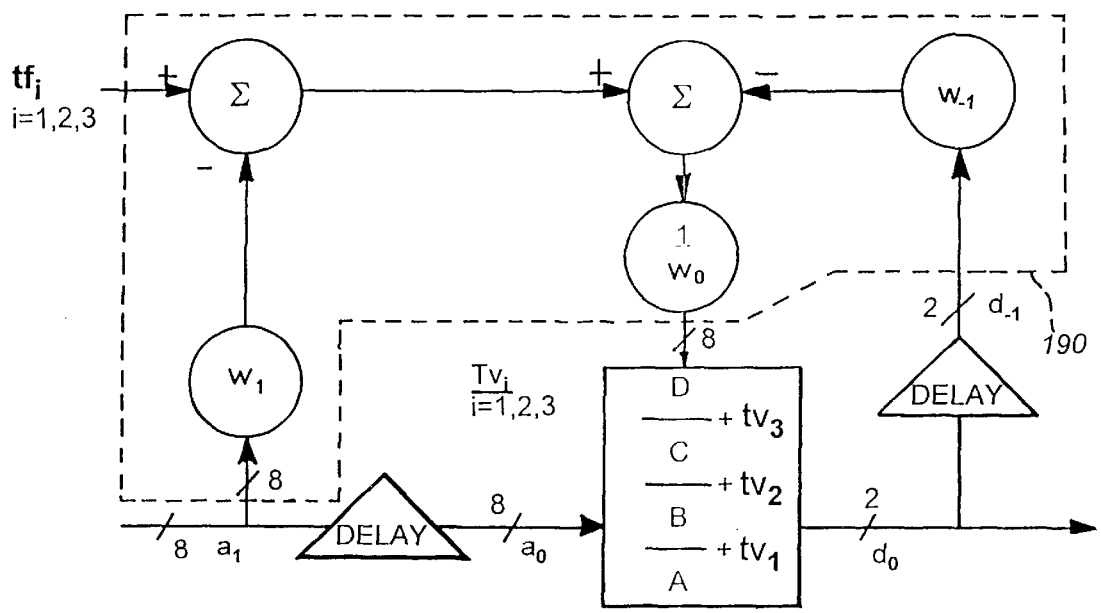
FIG. 11b illustrates a transformation that may be applied to the FIR filter functional block diagram of FIG. 11a, according to the present invention.

Referring to the decision block 192 of FIG. 11b, it can be seen that the decision $d_0$ output by the FIR filter is determined by the expression of $y_0 > tf_i$ (I=1,2,3). The expression $y_0 > tf_i$ (I=1,2,3) is equivalent to:

$$a_0 > [(tf_1 - x_1 w_1 - d_{-1} w_{-1})/w_0] \equiv tv_i (I=1,2,3) \quad (6)$$

Equation (6) defines the arrangement shown in FIG. 11b. The dotted line 190 illustrated in FIG. 11b encloses an illustration of calculations that can be done by the PC 92 (See FIG. 10) and that yield the variable threshold values $tv_i$ that can be stored in the lookup table of the present invention. Although the transformation illustrated has been shown as applied to the 2-sample plus last -2 decision TMLSE of FIG. 7, it is to be appreciated that this same transformation can be applied to the other TMLSE embodiments described above.

As discussed above, the lookup table 42 as illustrated in FIG. 7 provides at an output on line 52 the variable threshold values tv1, tv2 and tv3. Using the expression of Equation (6), these variable threshold values can be represented by equation (7):

$$a_0 > \{tf_n - (a_1 w_1 + d_{-1} w_{-1} + d_{-2} w_{-2})\}/w_0 = tv_n, \text{ where } (n=1,2,3.) \quad (7)$$

In equation (7), the next sample to be taken is represented as $a_1$, the previous decision is represented as $d_{-1}$, and the decision prior to the previous decision is represented as $d_{-2}$. The weights values $w_i$ are intermediate values to be calculated based upon the known data and the current sample $a_0$. The values $tf_n$ are a fixed part of each variable threshold value $tv_n$, wherein the fixed part $tf_n$ does not depend on any of the previous decisions or the next sample to be decided upon.

Referring to Equation (8)–(10) below, it can be seen that the fixed part $tf_n$ of the variable threshold values can be computed from the known data. In particular, the fixed threshold values $tf_n$ of each variable threshold value $tv_n$ is the mean of two known sample values a $S_{MN}$ (where M =0,1 and N=0,1) of the known original data 00, 01, 11, or 10. If the original data for the $j^{th}$ symbol was "00", then $d_j = S_{00}$; if the original data for the $j^{th}$ symbol was 01, then $d_j = S_{01}$; if the original data for the $j^{th}$ was 11, then $d_j = S_{11}$; and if the original data for the $j^{th}$ symbol was 10, then $dj = S_{10}$.

$$tf_3 = [(S_{00} + S_{01})/2] \quad (8)$$

$$tf_2 = [(S_{01} + S_{11})/2] \quad (9)$$

$$tf_1 = [(S_{11} + S_{10})/2] \quad (10)$$

Referring to Equation (7) the current sample of the RF waveform output on line 94 to the personal computer 92 (see FIG. 10) is compared against the fixed threshold values to determine the value of the weights $w_i$.

The intermediate values for the weights $w_i$ can be found from standard techniques for least mean square filtering known to those of skill in the art. For example, reference can made to an article by B. Widrow et al entitled "Stationary and Nonstationary Learning Characteristics of the LMS Adaptive Filter;" Proc. IEEE, Vol. 64 No. 8, pp. 1151 to 1162, August 1976. In particular, to determine the weights, a calculation is run on the personal computer 92 of FIG. 10 wherein the original data $d_j$ on line 90 and the data output from the A/D converter $a_j$ of the WLAN card 12 on line 94 are used. The output of the A/D converter for the current sample $d_j$ is represented by the vector $A_j$ of Equation (11):

$$A_j = [\ldots a_{j-2}, a_{j-1}, a_{j,0}, 1_{j,1}, \ldots]^T \tag{11}$$

The output of the A/D converter and the decision on the previous samples $d_{j-2}, d_{j-1}$ are used to form the vector Xj defined in Equation (12):

$$X_j = [d_{j,-2}, d_{j,-1}, a_{j,0}, a_{j,1}]^T \tag{12}$$

The vector $X_j$ is determined for all groups of four samples in the generated data stream. A cross-correlation vector $P_x$ is then calculated from Equation (13), using an average for expectations of mean square error, as represented by E[ ]:

$$P_x = E[d_j X_j] \tag{13}$$

In addition, a covariance matrix of $X_j$ is determined by Equation (14):

$$R_x = E[X_j X_j^T] \tag{14}$$

From each of the above, a vector of weights W is determined from Equation (15):

$$W = R_x^{-1} P \tag{15}$$

Once the weights have been determined as discussed above, Equation (7) is used to determine the variable threshold values $tv_n$. In particular, the lookup table is set to the 4-ary mode by the 1-bit control line 41 (see FIGS. 7–9) and the variable threshold number $tv_1$, $tv_2$ or $tv_3$ is determined by the 2-bit control word on line 64 (see FIG. 7). For each count of a counter (not illustrated), the contents of the lookup table addressed by the remaining twelve bits comprising $a_2$, $a_1$, $d_{-2}$, $d_{-1}$ provided to the lookup table are the output values $tv_n$ from Equation (7) when the same 12-bit word is input to Equation (7). This is done for each of n=1, n=2 and n=3.

Thus, the lookup table of the TMLSE of the present invention can be calibrated by generating a known data sequence, providing the known data sequence to a WLAN card including the TMLSE, as a modulated RF waveform; sampling the modulated RF waveform, outputting samples of the RF waveform; and calculating the variable threshold values from the known data and the sample values. In particular, the step of calculating the variable threshold values includes determining fixed threshold values that are a part of the variable threshold values from the sampled values; determining intermediate weight values that are part of the variable threshold values from the sampled values and prior decisions made on the sampled values; and calculating the variable threshold values from the fixed threshold values and the intermediate weight values.

Referring to Equation (7) it can be seen that the threshold values tv are constrained to be linear functions of the data sample ($a_1$) and the previous decision ($d_{-1}$ and $d_{-2}$). In addition the weights ($w_1, w_0, w_{-1}$ and $w_{-2}$) are the same for all three threshold values. However, for FSK signals demodulated by, for example, a practical discriminator, neither of these assumptions are true. Thus, it is desirable to remove the requirement that the weights are the same for all three threshold values. A second method for determining the contents of the lookup table for each embodiment of the TMLSE of the present invention uses a separate covariance matrix for each of the three threshold values.

For this method, the setup shown in FIG. 10 for calibrating and programming the lookup table is again used. As discussed above, the original data at the receiver is known. If the data that produced a received sample was either 10 or 11, it will be used to calculate weight $W_1$. If the data that produced a received sample was either 11 or 01, it will be used to calculate weight $W_2$. If the data that produced a received sample was either 01 or 00, it will be used to calculate weight $W_3$. Letting n denote Weight Vector number 1, 2, or 3, (below, n denotes only those elements which are used in determining the weight $W_n$). Three new A vectors, each made up of only those samples which are used to calculate its threshold, are defined by Equation (16):

$$A_{j,n} = [\ldots a_{j-2,n}, a_{j-1,n}, a_{j,0,n}, a_{j,1,n'} \ldots]^T \quad (n=[1,2,3]) \tag{16}$$

The output of the A/D converter and the decision on the previous samples are used to form three vectors $X_{j,n}$ as defined by Equation (17):

$$X_{j,n} = [d_{j-2,n}, d_{j-1,n}, a_{j,0}, a_{j,1,n}]^T \quad (n=1,2,3]) \tag{17}$$

Using an approximation that the decision feed back is almost always correct, the $X_{j,n}$ vector is found for all groups of four successive samples in the data stream. An average for expectation (E[ ]) can then be used to calculate the vectors defined by Equation (18):

$$P_{x,n} = E[d_{j,n} X_{j,n}] \quad (n=[1,2,3]) \tag{18}$$

and the covariance matrixes of $X_{j,n}$ defined by Equation (19):

$$R_{x,n} = E[X_{j,n} X_{j,n}^T] \quad (n=[1,2,3]) \tag{19}$$

and to find the vectors of weights defined by Equation (20):

$$W_n = (R_{x,n})^{-1} P_{x,n} \quad (n=[1,2,3]) \tag{20}$$

The contents of the lookup table for the memory location described by the 12-bit word; $a_1[0:7]$, $d_{-1}[0:1]$, $d_{-2}[0:1]$}, is then defined by Equation (21):

$$\{tf_n - (a_1 w_1, n + d_{-1} w_{-1,n}, + d_{-2} w_{-2,n})\} / w_{0,n} = tv_{n'} \tag{21}$$

where (n=1,2,3).

It is to be noted that for this method, $a_1$, $d_{-1}$, $d_{-2}$ are not sorted by which weights they were used to calculate. All are used to calculate each threshold value. This method will provide better results than the first method where the threshold values are derived directly from the DFE model. However, since it uses three rather than one covariance matrixes, this method will use three times the data for calibrating and programming the lookup table of the TMLSE.

It is to be appreciated if the number of thresholds (equal to the number of possible signal frequencies of the modulated signal minus 1) is K, a similar "K Covariance Matrix" method can be developed by following the same steps as shown above.

However, using the above-described method, all thresholds are still constrained to be linear functions of the data sample ($a_1$) and the previous decisions ($d_{-1}$ and $d_{-2}$). This constraint can be removed by using the a third method. In this method, the thresholds are calculated by determining functions ($F_0$, $F_1$, and $F_2$) as defined by Equations (22)–(24):

$$tv_o=F_0(a_1 d_{-1}\ d_{-2}) \text{ gives the probability of [01] detection equal to the probability of a [11] detection.} \quad (22)$$

$$tv_1=F_1(a_1 d_{-1}\ d_{-2}) \text{ gives the probability of a [00] detection equal to the probability of a [01] detection.} \quad (23)$$

$$tv_2=F_2(a_1 d_{-1}\ d_{-2}) \text{ gives the probability of a [11] detection equal to the probability of a [10] detection.} \quad (24)$$

This will maximize the probability that correct decisions are made, without making any constraints on the form of the relationship between data samples and threshold settings.

This method is the most general and will give the best results. However, since covariance matrixes must be calculated, rather than one covariance matrixes, approximately one-hundred times the data will be used than using the first method where the values are derived directly from the DFE model.

It is to be appreciated that the above-described methods for determining the contents of the lookup table can be used in a plurality of different manners to calibrate each wireless radio card 12 to be manufactured. For example, a first way to use any of the methods is to use the method once at a time of design of the wireless card and to use the results of the calibration for all wireless radio cards thereafter manufactured. Alternatively, a second way may be to periodically use the method based on a plurality of samples of wireless radio cards produced to determine the calibrated threshold values. Further, a third way to use the method can be to use the method to determine the contents of the lookup table for each unit manufactured. It is to be understood that each of these as well as any alteration or modification known to those of skill in the art are intended to be within the scope of the present invention.

Having thus described several embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and the invention is limited only as defined in the following claims and the equivalents thereto.

What is claimed is:

1. A truncated maximum likelihood sequence estimator that provides at an output a best estimate of a transmitted symbol, comprising:

a memory containing a lookup table including a plurality of threshold values, each of the threshold values stored in the lookup table being a function of a next sample of a received signal, a first decision made on a first previous sample of the received signal and a second decision made on a second previous sample of the received signal, and providing at an output at least one threshold value from an addressed location within the lookup table identified by the next sample of the received signal, the first decision made on the first previous sample and the second decision made on the second previous sample; and a comparator, coupled to the output of the lookup table and responsive to the at least one threshold value provided by the lookup table and a current sample of the received signal, comparing the current sample of the received signal with the at least one threshold value and providing as an output the best estimate of the transmitted symbol.

2. The truncated maximum likelihood sequence estimator of claim 1, wherein the received signal is a 4-ary frequency shift keyed signal and the at least one threshold value includes three threshold values so that the best estimate of the transmitted symbol of the current sample of the 4-ary frequency shift keyed (FSK) received signal is generated from the next sample of the 4-ary FSK received signal, the first decision and the second decision.

3. The truncated maximum likelihood sequence estimator of claim 2, wherein the current sample and the next sample of the 4-ary frequency shift keyed received signal are each eight bits in length and wherein each of the first decision and the second decision is two bits in length.

4. The truncated maximum likelihood sequence estimator as claimed in claim 3, wherein the lookup table contains a minimum of $2^{14}$ addressable locations, each addressable location having an 8-bit capacity.

5. The truncated maximum likelihood sequence estimator of claim 2, further comprising:

a first delay element responsive to the next sample of the received signal, that delays the next sample of the received signal by one clock cycle and that provides at an output the current sample of the received signal;

a second delay element coupled to the output of the comparator, that delays the best estimate of the transmitted symbol by one clock cycle and that provides at an output the first decision made on the first previous sample; and a third delay element coupled to the second delay element that delays the first decision made on the first previous sample by one clock cycle and that provides at an output the second decision made on the second previous sample.

6. The truncated maximum likelihood sequence estimator of claim 1, wherein the received signal is a 2-ary frequency shift keyed (FSK) signal, the at least one threshold value includes one threshold value and so that the best estimate of the transmitted symbol of the current-sample of the 2-ary FSK received signal is generated from a first sample of 2-ary FSK received signal, a second sample of the 2-ary FSK received signal, the first decision and the second decision.

7. The truncated maximum likelihood sequence estimator of claim 6, wherein each of the current sample, the first sample and the second sample of the 2-ary frequency shift keyed received signal is six bits in length and wherein each of the first decision and the second decision made by the truncated maximum likelihood sequence estimator is one bit in length.

8. The truncated maximum likelihood sequence estimator of claim 7, wherein the lookup table includes a minimum of $2^{14}$ addressable memory locations, each addressable memory location having a 6-bit capacity.

9. The truncated maximum likelihood sequence estimator of claim 6, further comprising:

a first delay element responsive to the second sample of the received signal, that delays the second sample by a clock cycle and that provides at an output the first sample of the received signal;

a second delay element coupled to the first delay element, that delays the first sample of the received signal by a clock cycle and that provides at an output the current sample of the received signal;

a third delay element coupled to the output of the comparator, that delays the best estimate of the transmitted symbol by a clock cycle and that provides at an output the first decision made on the first sample of the received signal; and a fourth delay element coupled to the third delay element, that delays the first decision made on the first sample of the received signal by a clock cycle and that provides at an output the second decision made on the second sample of the received signal.

10. A wireless digital unit, comprising:

an antenna that transmits and receives an RF waveform including a modulated symbol stream;

a transmitter coupled to the antenna, that receives a mapped data stream from a modem, that modulates the mapped data stream to provide the modulated symbol stream and that converts the modulated symbol stream into the RF waveform;

a receiver coupled to the antenna, that receives the RF waveform from the antenna, that converts the RF waveform to a demodulated symbol stream and that samples the demodulated symbol stream to provide samples of the demodulated symbol stream;

a modem that maps digital information into the mapped data stream and that unmaps the samples of the demodulated symbol stream to provide a best estimate of the symbol stream, the modem including a truncated maximum likelihood sequence estimator, including:

a memory containing a lookup table including a plurality of threshold values, each threshold value being a function of a next sample of a received signal, a first decision made on a first previous sample of the received signal and a second decision made on a second previous sample of the received signal, and providing at an output at least one threshold value from an addressed location within the lookup table identified by the next sample of the received signal, the first decision made on the first previous sample and the second decision made on the second previous sample; and a comparator, coupled to the lookup table and responsive to the at least one threshold value provided by the lookup table and a current sample of the received signal, comparing the current sample of the received signal with the at least one threshold value and providing as an output the best estimate of the symbol stream.

11. The wireless digital unit of claim 10, wherein the wireless digital unit is embodied on a card that further includes an interface to a computer.

12. A wireless local area network, comprising:

a first computer interfaced to a first wireless digital unit;

a processor interfaced to a second wireless digital unit so that the computer communicates wirelessly with the processor via the wireless units, wherein the first wireless unit and the second wireless unit each include:

a memory containing a lookup table including a plurality of threshold values, each threshold value being a function of a next sample of a received signal, a first decision made on a first previous sample of the received signal and a second decision made on a second previous sample of the received signal, and providing at an output at least one threshold value from an addressed location within the lookup table identified by the next sample of the received signal, the first decision made on the first previous sample and the second decision made on the second previous sample; and;

a comparator, coupled to the output of the lookup table and responsive to the at least one threshold value provided by the lookup table and a current sample of the received signal, comparing the current sample of the received signal with the at least one threshold value and that outputs a best estimate of the current sample of the received signal.

13. The wireless local area network of claim 12, wherein the processor is a second computer and wherein the wireless communications are between the first computer and the second computer so as to provide ad-hoc wireless connectivity between the first computer and the second computer.

14. The wireless local area network of claim 12, wherein the processor is an access point for wireless devices coupled to a computer network and wherein the communications are between the first computer and the processor so as to provide wireless connectivity between the first computer and the computer network.

15. A method for calibrating a wireless digital unit including a truncated maximum likelihood sequence estimator that provides a best estimate of a transmitted symbol and that includes a memory containing a lookup table including a plurality of threshold values, each of the threshold values stored in the lookup table being a function at least a next sample of a received signal, a first decision made on a first previous sample of the receive signal and a second decision made on a second previous sample of the received signal, and a comparator, coupled to an output of the lookup table and responsive to at least one threshold value output from the lookup table and a current sample of the received signal, that compares the current sample of the received signal with the at least one threshold value and that provides the best estimate of the transmitted symbol, the method comprising the steps of:

generating a known data sequence;

modulating a carrier signal with the known data sequence to provide a modulated RF waveform;

transmitting the modulated RF waveform to the wireless digital unit;

receiving the modulated RF waveform with the wireless digital unit and sampling the modulated RF waveform to yield samples of the modulated RF waveform; and calculating the at least one threshold value for the address location from the known data and the samples of the RF waveform.

16. The method as claimed in claim 15, wherein the step of calculating the at least one threshold value for the address location includes:

determining at least one fixed threshold value from the sampled values of the RF waveform;

determining at least one intermediate weight value from the sample value of the RF waveform and prior decisions made on the sampled value of the RF waveform; and calculating the at least one threshold value from the fixed threshold value and the intermediate weight value.

* * * * *